(12) United States Patent
Aulanko et al.

(10) Patent No.: US 7,500,549 B2
(45) Date of Patent: Mar. 10, 2009

(54) PEOPLE MOVER

(75) Inventors: Esko Aulanko, Kerava (FI); Jorma Mustalahti, Hyvinkää (FI); Marc Ossendorf, Bochum (DE)

(73) Assignee: Kone Corporation, Helsinki (FI)

( * ) Notice: Subject to any disclaimer, the term of this patent is extended or adjusted under 35 U.S.C. 154(b) by 136 days.

(21) Appl. No.: 11/584,746

(22) Filed: Oct. 23, 2006

(65) Prior Publication Data

US 2007/0082772 A1 Apr. 12, 2007

Related U.S. Application Data

(63) Continuation of application No. PCT/FI2005/000166, filed on Mar. 29, 2005.

(30) Foreign Application Priority Data

Apr. 22, 2004 (FI) .................................. 20040564

(51) Int. Cl.
*B66B 23/00* (2006.01)
*B66B 21/10* (2006.01)
(52) U.S. Cl. ..................... 198/321; 198/330; 198/813
(58) Field of Classification Search ................. 198/321, 198/330
See application file for complete search history.

(56) References Cited

U.S. PATENT DOCUMENTS

| | | | |
|---|---|---|---|
| 2,270,000 A | 1/1942 | Danker | |
| 2,649,181 A * | 8/1953 | Hansen | 198/329 |
| 3,365,051 A * | 1/1968 | Mullis et al. | 198/833 |
| 3,419,127 A * | 12/1968 | Yost | 198/329 |
| 6,092,639 A * | 7/2000 | Reo | 198/329 |
| 7,063,202 B2 * | 6/2006 | Ossendorf | 198/321 |

FOREIGN PATENT DOCUMENTS

| | | |
|---|---|---|
| DE | 34 12 995 A1 | 10/1985 |
| DE | 196 34 668 A1 | 3/1998 |
| JP | 04089791 A * | 3/1992 |
| WO | WO 2004/043835 A | 5/2004 |

OTHER PUBLICATIONS

International Search Report dated Dec. 5, 2005, issued in PCT/FI2005/000166.

* cited by examiner

*Primary Examiner*—Mark A Deuble
(74) *Attorney, Agent, or Firm*—Venable LLP; Robert Kinberg; Ryan M. Flandro

(57) ABSTRACT

A people mover, such as a travelator, moving ramp or escalator, comprises a conveyor. The conveyor comprises a frame having a first frame part secured to a fixed structure, and a second frame part mounted to be movable in relation to the first frame part in the longitudinal direction. The first and second frame parts are arranged one after the other. Transport platforms are secured to a first drive element and a second drive element. The drive elements are endless elements. A first tensioning device tensions the first drive element and a second tensioning device tensions the second drive element. Each tensioning device acts between the first frame part and the second frame part. The conveyor additionally comprises mechanical transmission elements between the first and second tensioning devices for keeping the stroke lengths of the first and the second tensioning movements equal.

12 Claims, 6 Drawing Sheets

PEOPLE MOVER

CROSS-REFERENCE TO RELATED APPLICATIONS

This application is a continuation of International Application No. PCT/FI2005/000166, filed Mar. 29, 2005, designating the United States and claiming priority from Application FI20040564 filed in Finland on Apr. 22, 2004. The disclosures of both foregoing applications is incorporated herein by reference.

BACKGROUND OF THE INVENTION

A travelator, moving ramp or escalator, collectively referred to herein as a people mover, comprises a conveyor. Such a conveyor is known to include a frame, which comprises a first frame part secured to a fixed structure and a second frame part mounted to be movable with respect to the first frame part in its longitudinal direction, the first and second frame parts being mounted one after the other. A first drive element is located on a first side of the conveyor and implemented as an endless loop. A second drive element is disposed on a second side of the conveyor at a distance from and parallel to the first drive element and implemented as an endless loop. A plurality of conveyor platforms, such as pallets or stairs, are arranged one after the other and secured to the first drive element and the second drive element. A first wheel is disposed on the first side at a first end of the conveyor and mounted with bearings on the first frame part, the first drive element being passed over the first wheel. A second wheel is disposed on the first side of the conveyor at a second end and mounted with bearings on the second frame part, the first drive element being passed over the second wheel. A third wheel is disposed on the second side at the first end and mounted with bearings on the first frame part, the second drive element being passed over the third wheel. A fourth wheel is disposed on the second side at the second end and mounted with bearings on the second frame part, the second drive element being passed over the fourth wheel. A first tensioning device is disposed on the first side and arranged to act between the first frame part and the second frame part to force the first wheel and the second wheel flexibly away from each other to tension the first drive element with a first tensioning movement. A second tensioning device, disposed on the second side of the conveyor, is of a construction substantially identical with the first tensioning device and arranged to act between the first frame part and the second frame part to force the third wheel and the fourth wheel flexibly away from each other to tension the second drive element with a second tensioning movement. By tensioning the drive element, a drive element tension suitable in respect of operation of the conveyor is maintained.

Today, however, there is a need for travelators, moving ramps and/or escalators in which the transport distances are very long and in which the distance between the wheels of the drive elements are consequently also very long. For example, in very long travelators, the distance between the wheels can be long, e.g. on the order of 100 meters.

Further, there has arisen a need for low-construction travelators, moving ramps and escalators designed to be mounted directly on a fixed base, such as a floor, without any special pits formed in the fixed structure, such as the floor of a building, for embedded mounting of the frame and machinery of the travelator. In the low-construction frame structure of a travelator, moving ramp or escalator mounted on a fixed base there is very little space for the drive machine of the conveyor, and therefore the diameter of the wheels has to be quite small and consequently the chain must have a small pitch (e.g. 15 . . . 20 mm). Thus, the number of chain links subject to wear over the length of the chain must be fairly large and the chain undergoes much larger elongation than conventionally. This means that the tensioning device must have a fairly long stroke (e.g. 300 . . . 400 mm). Also, the difference of elongation (due to uneven load or the like) in each chain is quite large. As the transport platforms are fastened to the chains, different elongation of the chains means that the transport platforms are not in a straight position when moving, and this leads to problems in the operation of the conveyor.

Usually the chains used in travelators and escalators are long-pitch drive chains (typically having a pitch of 100 . . . 200 mm). As the number of links subject to wear over the length of the conveyor is relatively small, the elongation is relatively small. Therefore, the chain tensioning device need not have a long stroke (typically <100 mm) and the elongation of each chain is relatively small. Thus, there has been no need for compensating the elongation.

SUMMARY OF THE INVENTION

An object of the invention is to overcome the above-mentioned drawbacks.

Another object of the invention is to provide a people mover, such as a travelator, moving ramp or escalator, wherein the strokes of the drive element tensioning devices can be synchronized so as to make them equal to each other.

A further object of the invention is to provide a people mover that has long-stroke tensioning devices particularly well suited for use in low-construction people mover apparatus.

The above and other objects are accomplished in the context of a people mover as first described above, wherein there is additionally provided, in one exemplary embodiment, mechanical transmission elements connected between the first tensioning device and the second tensioning device to keep stroke lengths of the first and the second tensioning movements substantially equal.

By tensioning the first and/or the second drive element, an adaptation to the change in the drive element's running length resulting from elongation and/or wear of the drive elements is achieved and a suitable tension of the drive element is maintained. There is additionally a need, however, to compensate a change in drive element tension caused by mutually different changes of length of the drive elements and the running track arranged for the drive elements, regardless of whether these changes are due to elongation, wear, expansion, contraction or other factors.

This compensation is accomplished by the provision of the mechanical transmission elements between the first tensioning device and the second tensioning device to maintain equal stroke lengths of the first and the second tensioning movements.

The mechanical transmission elements ensure that the stroke length of both tensioning devices is determined according to the length of the tensioning stroke required by the less elongated drive element, so that the tensioning stroke for the more elongated drive element remains somewhat shorter and the drive element in question correspondingly somewhat looser. By transmitting force from the more elongating side to the less elongating side, wear of the chains is also reduced. Due to the equal tensioning strokes, the transport platforms always move in a straight position. The mechanical transmission elements between the tensioning devices are simple, cheap and reliable and require little maintenance.

In another exemplary embodiment of the people mover, the first tensioning device comprises a first gearwheel; a first tensioning frame, which is secured to the first frame part and which comprises first gear teeth, which are in mesh with the first gearwheel on one side of it; a second tensioning frame, which is secured to the second frame part and which comprises second gear teeth, which are identical to the first gear teeth and are in mesh with the first gearwheel on the opposite side relative to the first gear teeth; and a first spring, which is arranged to act between the first and the second tensioning frames. The second tensioning device comprises a second gearwheel, whose gear teeth are identical in relation to the first gearwheel; a third tensioning frame, which is secured to the first frame part and which comprises third gear teeth, which are identical to the first gear teeth and are in mesh with the second gearwheel on one side of it; a fourth tensioning frame, which is secured to the second frame part and which comprises fourth gear teeth, which are identical to the first gear teeth and are in mesh with the second gearwheel on the opposite side relative to the third gear teeth; and a second tensioning spring, which is arranged to act between the third and the fourth tensioning frames. The first gearwheel and the second gearwheel are mounted on the same shaft. The shaft, the first gearwheel, the second gearwheel, the first gear teeth, the second gear teeth, the third gear teeth and the fourth gear teeth constitute the aforesaid mechanical transmission elements. In this way it is possible to form low-construction and long-stroke tensioning devices that are particularly well suited for use in low-construction travelators, moving ramps and escalators mounted on a fixed base. The first and the second tensioning devices may also have a common spring whose force output is shared between the tensioning devices. It is also possible to produce the force maintaining the tension by using other means than a spring/springs, for example by using a tensioning weight. However, a spring is an advantageous solution in respect of space utilization.

In a further exemplary embodiment of the people mover, a first tensioning frame comprises a number of mutually identical elongated first plates, each of which has first gear teeth and a first top edge. A second tensioning frame comprises a number of mutually identical second plates, each of which has second gear teeth and a second top edge. The first plates and the second plates are arranged as a pack wherein the plates are in an upright position in such manner that the first and the second plates alternately overlap each other and are fitted to be moved with respect to each other, the first gear teeth of the first plates are mutually aligned, the second gear teeth of the second plates are mutually aligned, and the first top edges of the first plates are in alignment at the same level with the second top edges of the second plates, the first top edges and the second top edges together forming a planar first bearing surface.

In yet another exemplary embodiment of the people mover, the third tensioning frame comprises a number of mutually identical third plates, each of which has third gear teeth and a third top edge. The fourth tensioning frame comprises a number of mutually identical fourth plates, each of which has fourth gear teeth and a fourth top edge. The third plates and the fourth plates are arranged as a pack wherein the plates are in an upright position so that the third and the fourth plates alternately overlap each other and are fitted to be moved with respect to each other, the third gear teeth of the third plates are mutually aligned, the fourth gear teeth of the fourth plates are mutually aligned, and the third top edges of the third plates are in alignment at the same level with the fourth top edges of the fourth plates, the third top edges and the fourth top edges together forming a planar second bearing surface.

In still a further exemplary embodiment of the people mover, the conveyor comprises a bearing rail for guiding the transport platforms as they are moving along an endless track, which has an upper portion for moving people from the first end of the conveyor, which is the entry end as seen in the transport direction, to the second end, which is the exit end in the transport direction, and a lower portion for returning the transport platforms from the second end back to the first end.

The first and the second bearing surfaces formed by the upper edges of the plates constitute a part of the upper portion of the track of the transport platforms.

In another exemplary embodiment of the people mover, the lengths of the gear teeth have been so fitted that the stroke length of the tensioning movement is on the order of 10-60 cm.

In a further exemplary embodiment of the people mover, the first drive element and the second drive element are link chains.

In another exemplary embodiment of the people mover, the conveyor comprises a drive arranged at the first end of the conveyor for driving the first wheel and the second wheel. The first tensioning device and the second tensioning device are disposed near the second end of the conveyor.

In another exemplary embodiment of the people mover, the conveyor comprises first synchronizing mechanism, which are arranged at the first end for mutual synchronization of the first wheel and the second wheel. The conveyor comprises second synchronizing mechanism, which are arranged at the second end of the conveyor for mutual synchronization of the second wheel and the fourth wheel.

In a further exemplary embodiment of the people mover, the people mover is a low-construction travelator, moving ramp or escalator designed to be mounted on a fixed base, such as a floor or other support.

BRIEF DESCRIPTION OF THE DRAWINGS

In the following, the invention will be described in detail with reference to exemplary embodiments and the attached drawing, wherein.

DETAILED DESCRIPTION OF THE INVENTION

Figure 1:
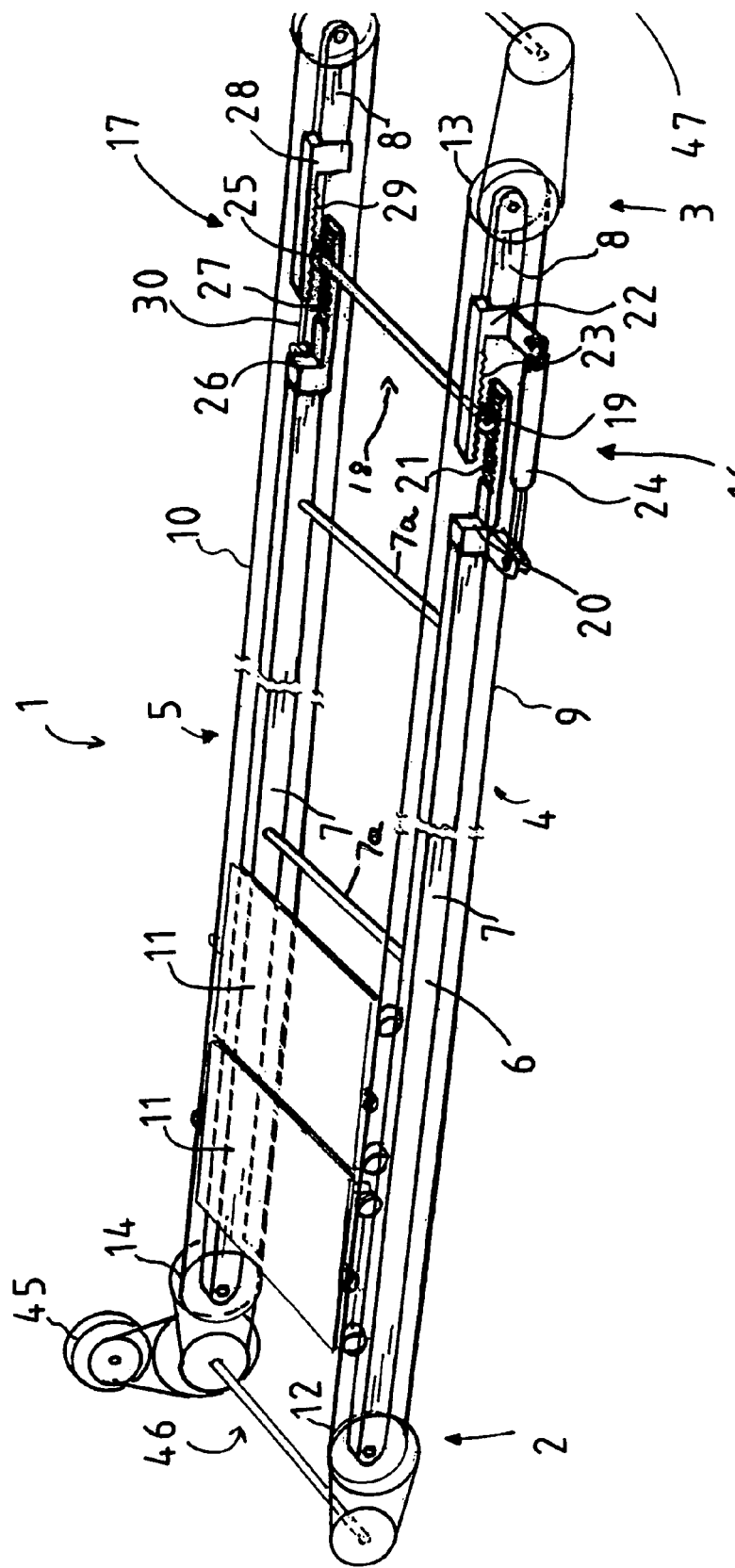
FIG. 1 is a diagrammatic and axonometric representation of an embodiment of a travelator according to the invention.
Figure 2:
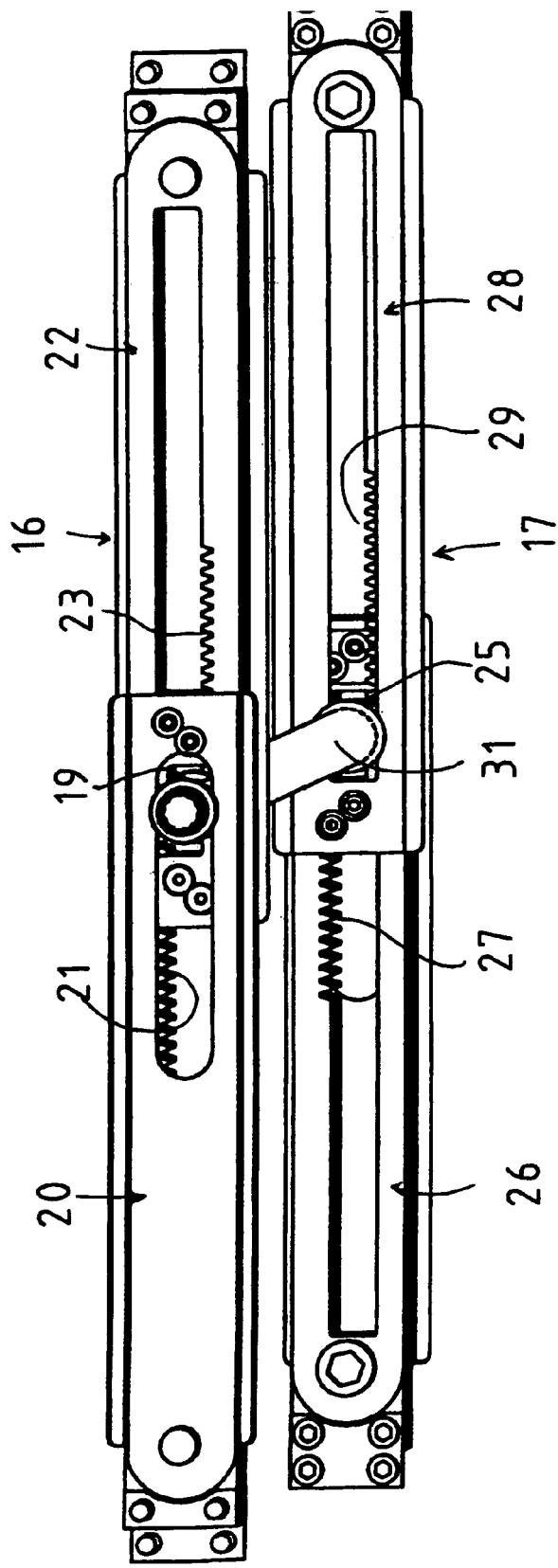
FIG. 2 presents an axonometric view from below of the first and the second tensioning devices connected by a mechanical transmission.

The people mover presented in FIG. 1 is a low-construction travelator designed to be mounted on a fixed base, such as a floor or other support. The principles of the invention described in the following are equally applicable to moving ramps and escalators.

The people mover comprises a conveyor 1, which has a first end 2, a second end 3, a longitudinal first side 4 and a longitudinal second side 5. The conveyor comprises a frame 6. The frame 6 comprises a first frame part 7 adapted to be secured to a fixed structure and a second frame part 8 mounted to be movable with respect to the first frame part 7 in its longitudinal direction, the frame parts being arranged one after the other. Each frame part 7 and 8 consists of two mutually parallel elongated frame halves placed at a distance from each other and connected together by transverse brackets 7a.

On the first side 4 of the conveyor 1 is a first drive element 9 implemented as an endless loop running over a first wheel 12 mounted with a bearing at the first end 2 of the conveyor and a second wheel 13 mounted with a bearing at the second end 3 of the conveyor. Correspondingly, placed at a distance from the first drive element and parallel to it on the second side 5 of the conveyor is a second drive element 10 implemented as an endless loop and running over a third wheel 14 mounted with a bearing at the first end 2 of the conveyor and a fourth wheel 15 mounted with a bearing at the second end 3 of the conveyor. The first drive element 9 and the second drive element 10 are preferably link chains.

A number of transport platforms 11, which in FIG. 1 are pallets, only two pallets being shown in the diagram, are arranged one after the other and fastened to the first drive element 9 and the second drive element 10.

On the first side 4 of the conveyor is a first tensioning device 16, which acts between the first frame part 7 and second frame part 8 to force the first wheel 12 and the second wheel 13 flexibly away from each other by a first tensioning spring 24 to tension the first drive element 9 with a first tensioning movement to compensate the elongation of the first drive element 9. On the second side 5 of the conveyor is a second tensioning device 17, which is of a construction substantially identical to that of the first tensioning device and is arranged to act between the first frame part 7 and second frame part 8 to force the third wheel 14 and the fourth wheel 15 flexibly away from each other by a second tensioning spring 30 to tension the second drive element 10 with a second tensioning movement to compensate the elongation of the second drive element 10. The first tensioning device 16 and the second tensioning device 17 are connected together by a mechanical transmission element 18 to maintain equal stroke lengths of the first and the second tensioning movements.

In FIG. 1, the tensioning devices 16 and 17 are shown at the level of principle. FIGS. 2-6 show a practical implementation of the tensioning devices, although other implementations are possible within the scope of the invention.

Referring to FIG. 1-6, the first tensioning device 16 comprises a first gearwheel 19. A first tensioning frame 20 is fastened to the first frame part 7. The first tensioning frame 20 comprises first gear teeth 21, which extend linearly in the longitudinal direction of the conveyor, thus forming a gear rack. The first gear teeth 21 are in mesh with the first gearwheel on one side of it, in FIG. 1 below, in FIG. 2-5 above the gearwheel.

A second tensioning frame 22 is fastened to the second frame part 8. The second tensioning frame 22 comprises second gear teeth 23, which are identical to the first gear teeth 21. The second gear teeth 23 are in mesh with the first gearwheel 19 on the opposite side relative to the first gear teeth 21, i.e. in FIG. 1 above, in FIG. 2-5 below the gearwheel. The first tensioning spring 24 acts between the first tensioning frame 20 and the second tensioning frame 22, tending to move them further apart from each other.

The second tensioning device 17 is identical to the first tensioning device 16. The second tensioning device 17 comprises a second gearwheel 25, on which the gear teeth are identical in relation to the first gearwheel 19. The third tensioning frame 26 is fastened to the first frame part 7. The third tensioning frame 26 comprises third gear teeth 27, which are identical to the first and the second gear teeth and in mesh with the second gearwheel 25 on one side of it, in FIG. 1 below and in FIG. 2-5 above the gearwheel.

The fourth tensioning frame 28 is fastened to the second frame part 8. The fourth tensioning frame 28 comprises fourth gear teeth 29, which are identical to the first gear teeth 21. The fourth gear teeth 29 are in mesh with the second gearwheel 25 on the opposite side relative to the third gear teeth 27, i.e. in FIG. 1 above and in FIG. 2-5 below the gearwheel.

The second tensioning spring 30 acts between the third tensioning frame 26 and the fourth tensioning frame 28, tending to move them further apart from each other.

The first tensioning spring 24 and the second tensioning spring 30 may be, for example, gas springs or helical springs. In an exemplary embodiment, the spring force of each spring 24, 30 is on the order of 2 kN.

The first gearwheel 19 and the second gearwheel 25 are mounted on the same shaft 31, which is freely rotatable. The shaft 31, the first gearwheel 19, the second gearwheel 25, the first gear teeth 21, the second gear teeth 23, the third gear teeth 27 and the fourth gear teeth 29 constitute mechanical transmission elements 18 keeping the tensioning movements of the tensioning devices 16 and 17 equal.

The lengths of the gear racks 21, 23, 27, 29 are adapted so that the stroke length of the tensioning movement can be on the order of 10-60 cm.

Figure 3:
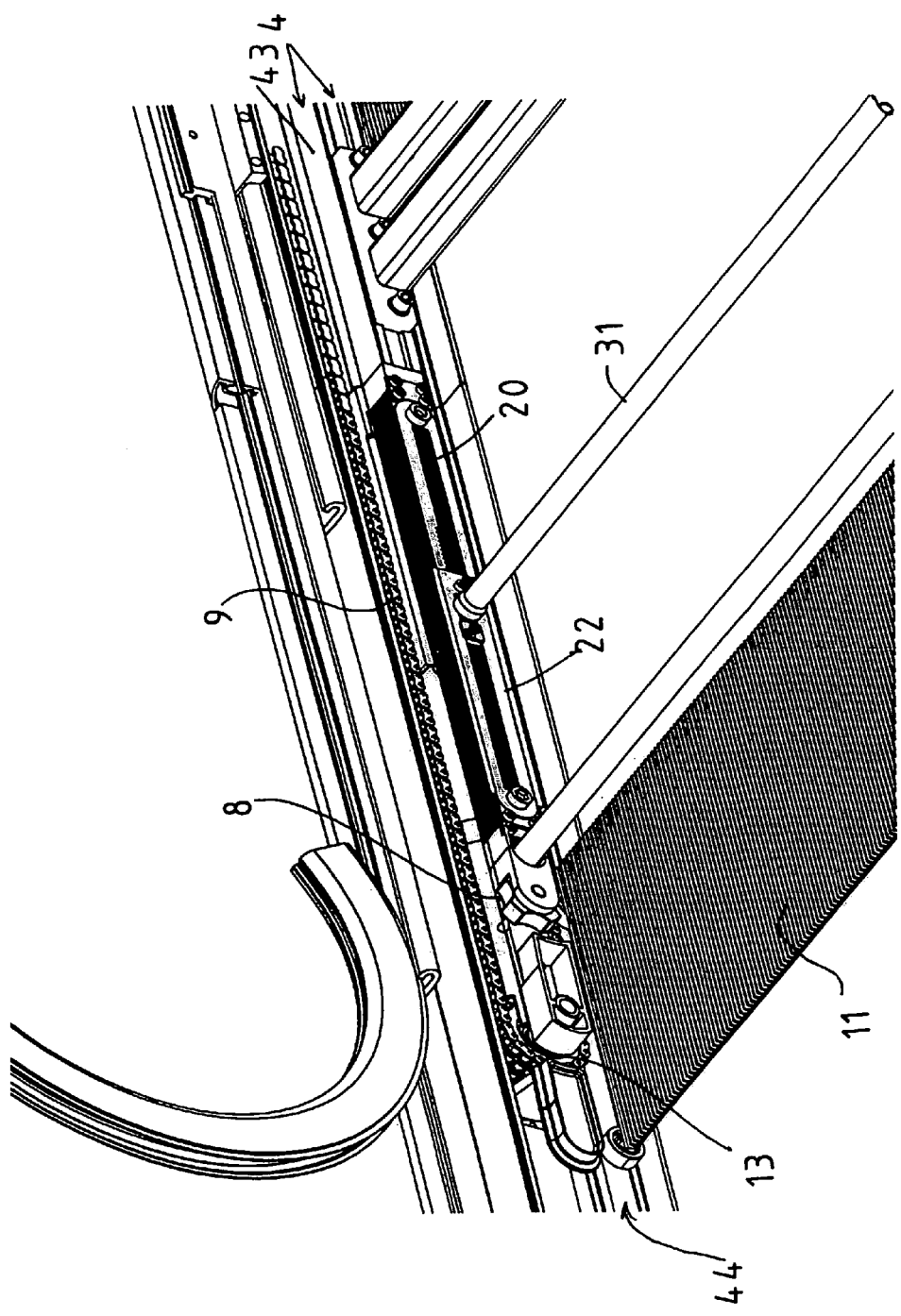
FIG. 3 presents an axonometric view of a part of the first side of the travelator at the second end of the conveyor, showing the first tensioning device.
Figure 4:
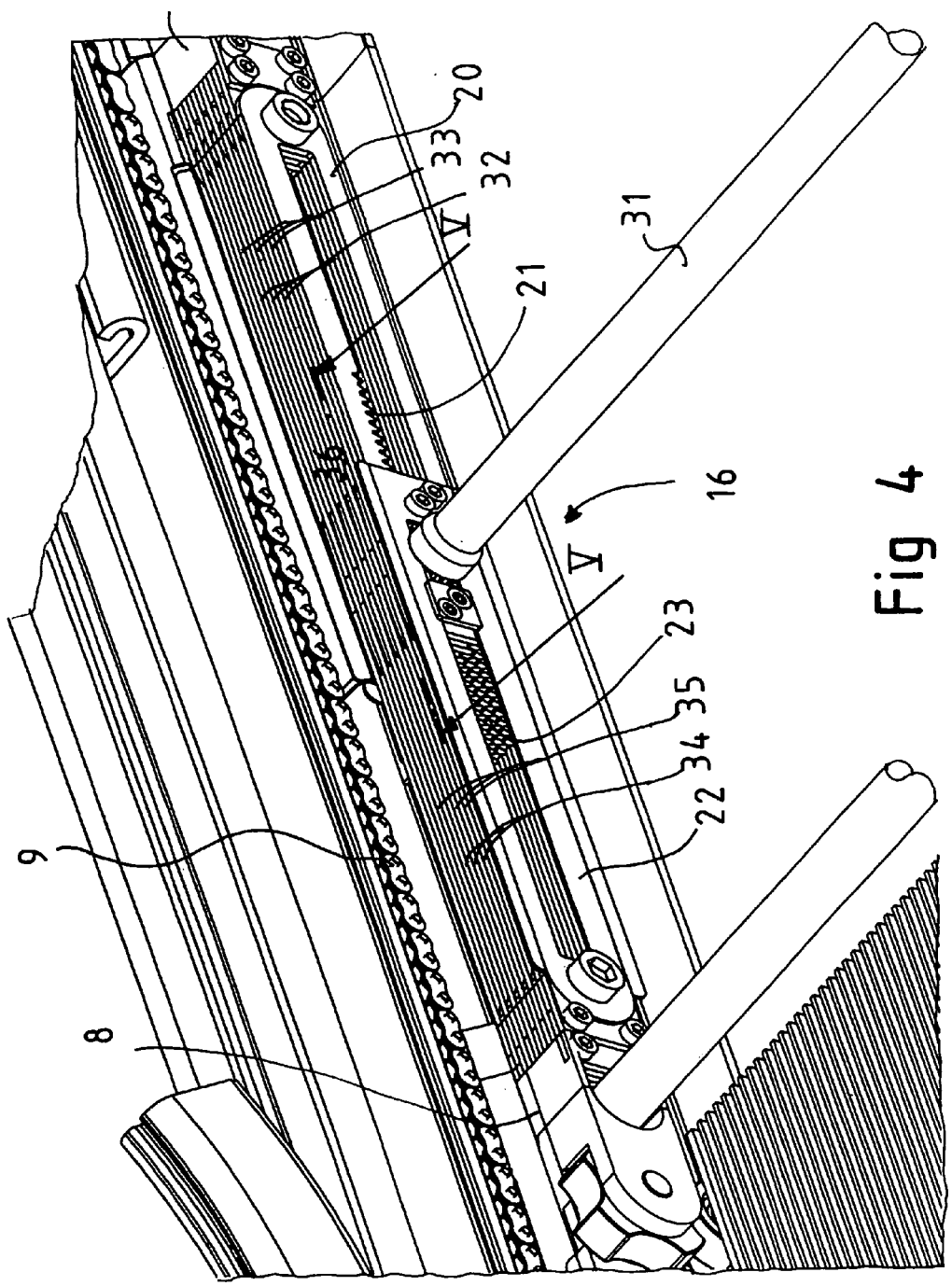
FIG. 4 presents a part of FIG. 3 in magnified form.
Figure 5:
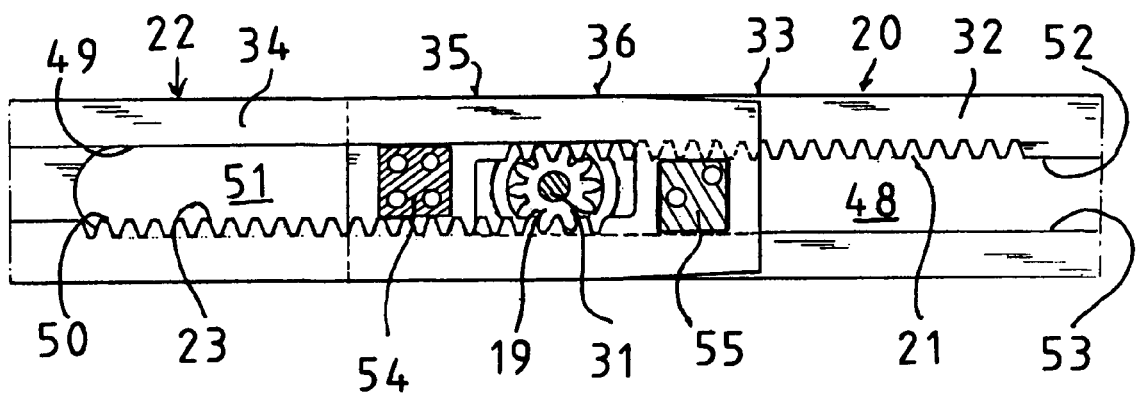
FIG. 5 presents a cross-section along V-V from FIG. 4.
Figure 6:
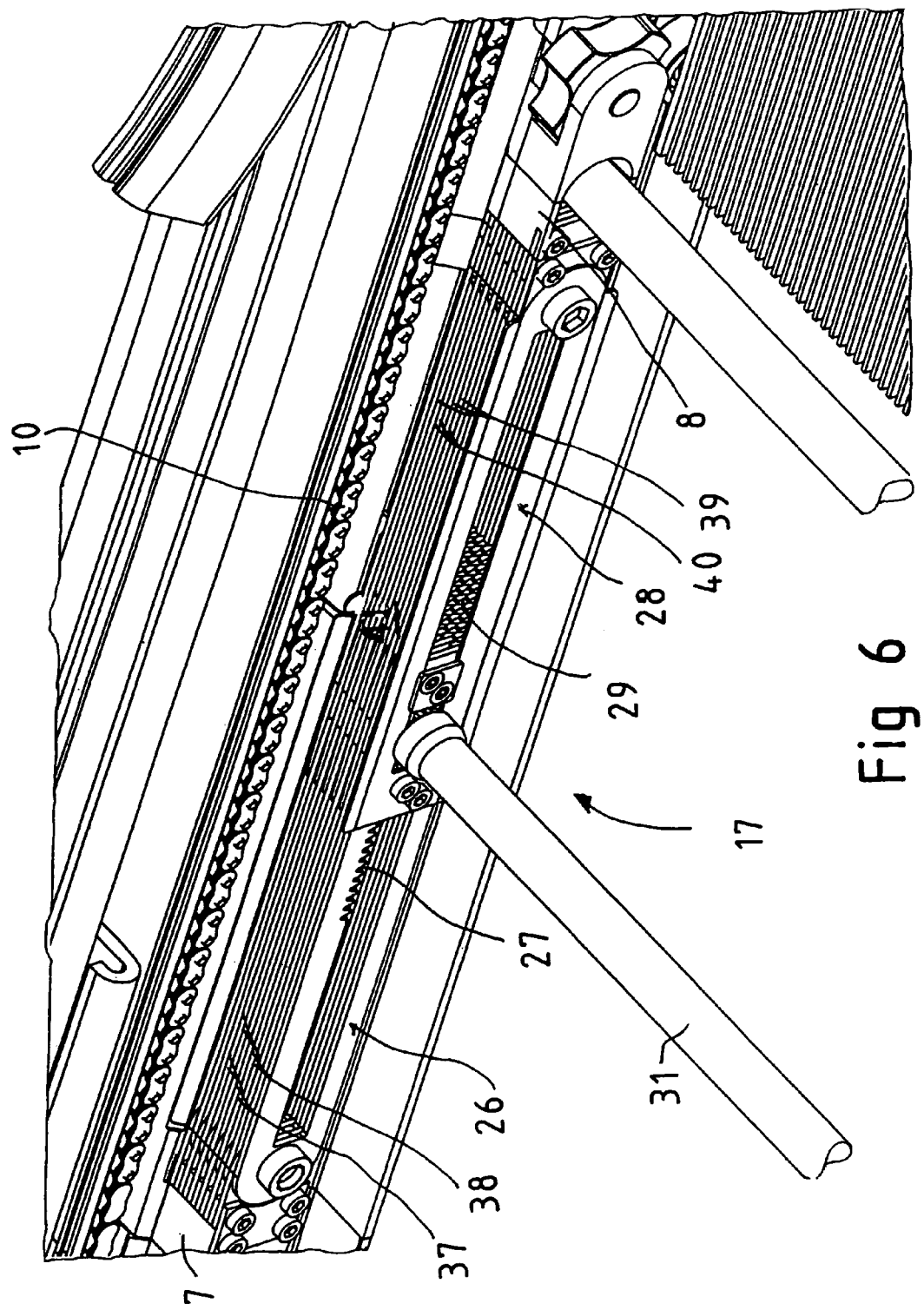
FIG. 6 presents a view corresponding to FIG. 4, showing the second side of the travelator at the second end of the conveyor and the second tensioning device.

The details of the structure of the first tensioning device 16 are shown in FIG. 3-5 and the details of the structure of the second tensioning device 17, which is identical in relation to the first tensioning device, are shown in FIG. 6.

Referring to FIG. 3-5, and especially to FIGS. 4 and 5, the first tensioning frame 20 comprises a number of mutually identical elongated first plates 32. Each plate 32 has first gear teeth 21 and a first top edge 33. Each plate 32 is provided with a longitudinal slot 48 which has an upper inner edge 52, in which the teeth 21 have been formed, and a smooth lower inner edge 53.

The second tensioning frame 22 comprises a number of mutually identical elongated second plates 34, each of which has second gear teeth 23 and a second top edge 35. Each plate 34 is provided with a longitudinal slot 51, which has a smooth upper inner edge 49 and a lower inner edge 50, in which the teeth 23 have been formed. The plates 32 and 34 are preferably about 2-4 mm thick.

The first plates 32 and the second plates 34 have been combined as a pack wherein the plates are in upright position so that the first plates 32 and the second plates 34 alternately overlap each other and are fitted to be movable with respect to each other. The first gear teeth 21 of the first plates 32 are mutually aligned, the second gear teeth 23 of the second plates 34 are mutually aligned, and the first top edge of the first plates 32 are aligned at the same level with the second top edges 35 of the second plates 34, the first top edges and the second top edges together forming a planar first bearing surface 36, on which the wheels of the transport platforms 11 can roll over the tensioning device 16.

The pack consisting of the first plates is held together by a guide piece 54 which goes through the slots 51 of the second plates 34 and which can slide along the upper and lower inner edges 49, 50 of the slots 51. The pack consisting of the second plates 34 is held together by a guide piece 55 which goes through the slots 48 of the first plates 32 and which can slide along the lower and upper inner edges 52, 53 of the slots 48.

As can be seen from FIG. 6, the second tensioning device 17 is structurally identical to the first tensioning device 16 in FIG. 4. The third tensioning frame 26 comprises a number of mutually identical elongated third plates 37, each of which has third gear teeth 27 and third top edge 38. The fourth tensioning frame 28 comprises a number of mutually identical fourth plates 39, each of which has fourth gear teeth 29 and fourth top edge 40. The third plates 37 and the fourth plates 39 are arranged as a pack wherein the plates are in an upright position in such manner that the third and the fourth plates alternately overlap each other and are fitted to be movable with respect to each other, the third gear teeth 27 of the third plates are mutually aligned, the fourth gear teeth 29 of the fourth plates are mutually aligned, and the third top edges 38 of the third plates are in alignment at the same level with the fourth top edges 40 of the fourth plates, the third top edges and the fourth top edges together forming a planar second bearing surface 41.

Referring again to FIGS. 1 and 3, the transport platforms 11 have wheels on each side parallel to the transport direction, which are supported by the bearing rail 42. The bearing rail 42 forms for the transport platforms 11 secured to the endless drive elements 9 and 10 a similarly endless track. This track comprises an upper portion 43 for transporting passengers from the second end 3 of the conveyor, which is the entry end as seen in the transport direction, to the first end 2, which is the exit end in the transport direction, and a lower portion 44 for returning the transport platforms from the first end back to the second end. The first bearing surface 36 on the first side 4 of the conveyor and the second bearing surface 41 on the second side 5 of the conveyor constitute a part of the upper portion 43 of the track without any discontinuities.

The conveyor 1 comprises a drive 45 arranged at the first end 2 of the conveyor for driving the first wheel 12 and second wheel 14, so the first end 2 is the driven end. The first tensioning device 16 and the second tensioning device 17 are disposed near the non-driven second end 3 of the conveyor.

For mutual synchronization of the movements of the drive elements 9 and 10, the conveyor 1 preferably comprises first synchronizing mechanism 46, which is arranged at the first end 3 for mutual synchronization of the first wheel 12 and the third wheel 14 and second synchronizing mechanism 47, which is arranged at the second end 4 of the conveyor for mutual synchronization of the second wheel 13 and the fourth wheel 15. A detailed description of a mutual synchronization system that could be used to implement this aspect of the invention is disclosed in commonly owned U.S. application Ser. No. 11/510,840, filed Aug. 28, 2006, the contents of which are incorporated herein by reference.

The invention is not limited to the embodiment examples described above; instead, many variations are possible within the scope of the inventive concept defined in the claims.

What is claimed is:

1. A people mover, comprising:
    a conveyor having a first end, a second end, a longitudinal first side and a longitudinal second side, the conveyor comprising:
        a frame including a first frame part having a longitudinal direction and adapted to be secured to a fixed structure and a second frame part mounted to be movable with respect to the first frame part in the longitudinal direction, the first and second frame parts being mounted one after the other;
        a first drive element, comprising an endless loop, located on the first side of the conveyor;
        a second drive element, comprising an endless loop, located on the second side of the conveyor at a distance from and parallel to the first drive element;
        a plurality of transport platforms, arranged one after the other and secured to the first drive element and the second drive element;
        a first wheel disposed on the first side at the first end of the conveyor and mounted on the first frame part, wherein the first drive element passes over the first wheel;
        a second wheel disposed on the first side at the second end of the conveyor and mounted on the second frame part, wherein the first drive element passes over the second wheel;
        a third wheel disposed on the second side at the first end of the conveyor and mounted on the first frame part, wherein the second drive element passes over the third wheel;
        a fourth wheel disposed on the second side at the second end of the conveyor and mounted on the second frame part, wherein the second drive element passes over the fourth wheel;
        a first tensioning device disposed on the first side of the conveyor and arranged to act between the first frame part and the second frame part to force the first wheel and the second wheel flexibly away from each other to tension the first drive element with a first tensioning movement;
        a second tensioning device disposed on the second side of the conveyor, having a construction substantially identical to the first tensioning device, and arranged to act between the first frame part and the second frame part to force the third wheel and the fourth wheel flexibly away from each other to tension the second drive element with a second tensioning movement; and
        mechanical transmission elements connected between the first tensioning device and the second tensioning device to keep stroke lengths of the first and the second tensioning movements substantially equal, wherein the mechanical transmission elements comprise a first gearwheel and a second gearwheel, the first gearwheel being in meshed connection on at least two sides in the first tensioning device to couple the first and second frame parts, and the second gearwheel being in meshed connection on at least two sides in the second tensioning device to couple the first and second frame parts.

2. A people mover according to claim 1,
    wherein the first tensioning device comprises:
        a first tensioning frame secured to the first frame part and comprising first gear teeth in mesh with the first gearwheel on one side of the first gearwheel;
        a second tensioning frame secured to the second frame part and comprising second gear teeth identical to the first gear teeth and in mesh with the first gearwheel on the opposite side relative to the first gear teeth; and
        a first spring arranged to act between the first and the second tensioning frames;
    wherein the second tensioning device comprises:
        a third tensioning frame secured to the first frame part and which comprises third gear teeth identical to the first gear teeth and in mesh with the second gearwheel on one side of the second gearwheel;
        a fourth tensioning frame secured to the second frame part comprising fourth gear teeth identical to the first gear teeth and in mesh with the second gearwheel on the opposite side of the second gear wheel relative to the third gear teeth; and
        a second spring arranged to act between the third and the fourth tensioning frames; and
    wherein the first gearwheel and the second gearwheel have identical gear teeth and are mounted on a common shaft, the common shaft, the first gearwheel, the second gearwheel, the first gear teeth, the second gear teeth, the third gear teeth and the fourth gear teeth constituting the mechanical transmission elements.

3. A people mover according to claim 1, wherein the first tensioning frame comprises a plurality of mutually substantially identical elongated first plates each of which has the first gear teeth and a first top edge; the second tensioning frame comprises a plurality of mutually substantially identical second plates each of which has the second gear teeth and a second top edge; the first plates and the second plates are arranged as a pack wherein the plates are in an upright position so that the first and the second plates alternately overlap each other and are fitted to be movable with respect to each other, the first gear teeth of the first plates are mutually aligned, the second gear teeth of the second plates are mutually aligned, and the first top edges of the first plates are in alignment at the same level with the second top edges of the second plates, wherein the first top edges and the second top edges together forming a planar first bearing surface.

4. A people mover according to 3, wherein the third tensioning frame comprises a plurality of mutually identical third plates each of which has third gear teeth and a third top edge; the fourth tensioning frame comprises a plurality of mutually identical fourth plates each of which has fourth gear teeth and a fourth top edge; the third plates and the fourth plates being arranged as a pack wherein the plates are in an upright position so that the third and the fourth plates alternately overlap each other and are fitted to be movable with respect to each other, the third gear teeth of the third plates are mutually aligned, the fourth gear teeth of the fourth plates are mutually aligned, and the third top edges of the third plates are in alignment at the same level with the fourth top edges of the fourth plates, wherein the third top edges and the fourth top edges together forming a planar second bearing surface.

5. A people mover according to claim 4, wherein the conveyor comprises a bearing rail forming an endless track for guiding the transport platforms as they are moving along the endless track; wherein the bearing rail includes an upper portion for moving people from a first end of the conveyor which constitutes an entry end as seen in a transport direction, to a second end which constitutes an exit end in the transport direction, and a lower portion for returning the transport platforms from the second end back to the first end; and wherein the first bearing surface and the second bearing surface constitute a part of the upper portion of the track.

6. A people mover according to claim 2, wherein the first, second, third and fourth gear teeth have lengths such that the stroke length of the tensioning movement is on the order of 10-60 cm.

7. A people mover according to claim 1, wherein the first drive element and the second drive element comprise link chains.

8. A people mover according to claim 1, wherein the conveyor comprises a drive arranged at the first end of the conveyor to drive the first wheel and the second wheel; and the first tensioning device and the second tensioning device are disposed near the second end of the conveyor.

9. A people mover according to claim 1, wherein the conveyor comprises a first synchronizing mechanism arranged at the first end for mutual synchronization of the first wheel and the third wheel.

10. A people mover according to claim 1, wherein the conveyor comprises a second synchronizing mechanism arranged at the second end of the conveyor for mutual synchronization of the second wheel and the fourth wheel.

11. A people mover according to claim 1, wherein the people mover comprises one of a low-construction travelator, moving ramp or escalator adapted for being mounted on a fixed base.

12. A people mover, comprising:
a conveyor having a first end, a second end, a longitudinal first side and a longitudinal second side, the conveyor comprising:
a frame including a first frame part having a longitudinal direction and adapted to be secured to a fixed structure and a second frame part mounted to be movable with respect to the first frame part in the longitudinal direction, the first and second frame parts being mounted one after the other;
a first drive element, comprising an endless loop, located on the first side of the conveyor;
a second drive element, comprising an endless loop, located on the second side of the conveyor at a distance from and parallel to the first drive element;
a plurality of transport platforms, arranged one after the other and secured to the first drive element and the second drive element;
a first wheel disposed on the first side at the first end of the conveyor and mounted on the first frame part, wherein the first wheel is rotatable about a first axis and the first drive element passes over the first wheel;
a second wheel disposed on the first side at the second end of the conveyor and mounted on the second frame part, wherein the second wheel is rotatable about a second axis and the first drive element passes over the second wheel;
a third wheel disposed on the second side at the first end of the conveyor and mounted on the first frame part, wherein the third wheel is rotatable about the first axis and the second drive element passes over the third wheel;
a fourth wheel disposed on the second side at the second end of the conveyor and mounted on the second frame part, wherein the fourth wheel is rotatable about the second axis and the second drive element passes over the fourth wheel;
a first tensioning device disposed on the first side of the conveyor and arranged to act between the first frame part and the second frame part to force the first wheel and the second wheel flexibly away from each other to tension the first drive element with a first tensioning movement;
a second tensioning device disposed on the second side of the conveyor, having a construction substantially identical to the first tensioning device, and arranged to act between the first frame part and the second frame part to force the third wheel and the fourth wheel flexibly away from each other to tension the second drive element with a second tensioning movement; and
mechanical transmission elements connected between the first tensioning device and the second tensioning device to keep stroke lengths of the first and the second tensioning movements substantially equal, wherein the first and second tensioning devices and the mechanical transmission elements are positioned at a distance from the first and second axes along the longitudinal direction

* * * * *